United States Patent
Lunsford et al.

(10) Patent No.: US 6,241,190 B1
(45) Date of Patent: Jun. 5, 2001

(54) TOWPLATE POSITIVE LOCK DEVICE

(75) Inventors: David A. Lunsford, Hawkinsville; Gregory L. Tinney; Charles Madox, both of Warner Robins, all of GA (US); Julius K. Blair, Mt. Vernon, KY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/433,763

(22) Filed: Nov. 4, 1999

(51) Int. Cl.$^7$ ........................................ B64D 1/12
(52) U.S. Cl. ........................................ 244/137.3
(58) Field of Search .................. 244/137.3, 118.1, 244/137.1, 142; 410/292

(56) References Cited

U.S. PATENT DOCUMENTS

| | | | |
|---|---|---|---|
| 4,303,213 | * 12/1981 | Bolender et al. | 244/137 R |
| 4,428,551 | * 1/1984 | Woram et al. | 244/137 R |
| 4,651,957 | * 3/1987 | Minnich et al. | 244/137 L |
| 5,697,581 | * 12/1997 | Conroy et al. | 244/137.3 |

* cited by examiner

*Primary Examiner*—Charles T. Jordan
*Assistant Examiner*—George L. Steele
(74) *Attorney, Agent, or Firm*—William G. Auton

(57) ABSTRACT

In order to accurately parachute cargo, a towplate assembly is mounted in the rear bay of a cargo aircraft, the drogue chute is attached to a towlink in the towplate assembly. The main parachutes are also attached to the towlink and the cargo. The drogue chute pulls the main parachutes from the aircraft which causes them to deploy and then pull the cargo from the aircraft. The removal of the towlink from the towplate is controlled by a positive lock device. A forward cam follower, in the locked mode, rests against the forward cam of the towlink. An electrically controlled actuator acting through a forward interlock pushing on an aft interlock being attached to the forward cam follower is biased against a stop by a spring. Undesired movement of the towlink will only force the aft interlock in the direction of further bias. Upon command, the actuator retracts and pulls the forward interlock to release the aft interlock from the stop position. When this occurs the towlink is free to leave the towplate assembly.

1 Claim, 4 Drawing Sheets

Locked Position

Unlock Position

TOWPLATE POSITIVE LOCK DEVICE

STATEMENT REGARDING FEDERALLY SPONSORED RESEARCH OR DEVELOPMENT

The invention described herein may be manufactured and used by or for the Government for governmental purposes without the payment of any royalty thereon.

CROSS-REFERENCES TO RELATED PATENT APPLICATIONS

None

BACKGROUND OF THE INVENTION

The present invention relates to cargo aircraft, and, in particular, relates to those which drop their cargo by parachute.

Dropping cargo from aircraft encompasses several techniques. In the first technique, the aircraft has a rear door which when opened exposes a ramp inside the aircraft. The aircraft may fly at a low altitude near a drop point and someone in the aircraft just pushes the cargo out of the aircraft. This technique clearly requires that the cargo be either well padded or nonfrangible. This also requires that the aircraft reach a sufficiently low altitude for this technique to work and would not work in a mountainous area. Other considerations would be foliage. A higher altitude may be used but this would require extensive padding for the cargo to survive the drop.

Another technique requires the use of a parachute for the cargo. Because of the tremendous forces involved in the extraction of the cargo from the aircraft, the main drop parachute is usually deployed from the aircraft by means of a drogue chute. This is a much small parachute which is deployed, normally by hand. The ability to hit a drop zone requires much practice because of the many factors involved: the aircraft speed, the wind direction, the launching of the drogue chute, the time for it to deploy, the time to pull the cargo from the aircraft bay, the time for the main parachute to open, the weight of the cargo, etc.

In order to eliminate a number of these variables, a towplate assembly has been used in performing airdrop missions. The towplate is located in the rear of the bay. The clrogue chute is attached to one end of the extraction link and the cargo chute(s) to the other end. The main parachute is attached to the cargo and deploys after the cargo is pulled from the bay by the main parachute. Because of the tremendous forces involved as the drogue chute is towed by the aircraft, the extraction link, although electro-mechanically held in place, is not removed in a predetermined manner due to design problems, i.e., upon command from the cargo master.

The present towplate uses an overcenter technique that prevents a towed parachute from prematurely pulling the towlink out of the towplate thereby initiating the cargo extraction. The deficiency with this approach is that the towlink must be precisely manufactured in order to ensure that the overcenter condition occurs when the towlink is installed in the towplate assembly. In fact, the prior device has experienced premature cargo releases as a result of the towlink being pulled out of the towplate assembly. The cause of this problem has been identified as variations in the towlink specification.

Thus, there exists a need for a towplate positive lock device which insures that the cargo is released on time irrespective of minor variations in the specifications of the towlink.

BRIEF SUMMARY OF THE INVENTION

In order to accurately parachute cargo, a towplate assembly is mounted in the rear bay of an cargo aircraft, the drogue chute is attached to a towlink in the towplate assembly. The main parachutes are also attached to the towlink and the cargo. The removal of the towlink from the towplate is controlled by means of a positive lock device.

A forward cam follower, in the locked mode, rests against the forward cam of the towlink. An electrically controlled actuator acting through a forward interlock pushing on an aft interlock being attached to the forward cam follower is biased against a stop by means of a spring. Undesired movement of the towlink will only force the aft interlock in the direction of further bias. Upon command, the actuator retracts and pulls the forward interlock to release the aft interlock from the stop position. When this occurs the towlink is free to leave the towplate assembly.

Therefore, one object of the present invention is to provide a positive lock device for a towplate assembly.

Another object of the present invention is to provide a positive lock device for a towplate assembly wherein minor manufacturing variations are of no concern in the release of the towlink from the aircraft.

These and many other objects and advantages of the present invention will be ready apparent to one skilled in the pertinent art from the following detailed description of a preferred embodiment of the invention and the related drawings.

DETAILED DESCRIPTION OF THE INVENTION

Figure 1:
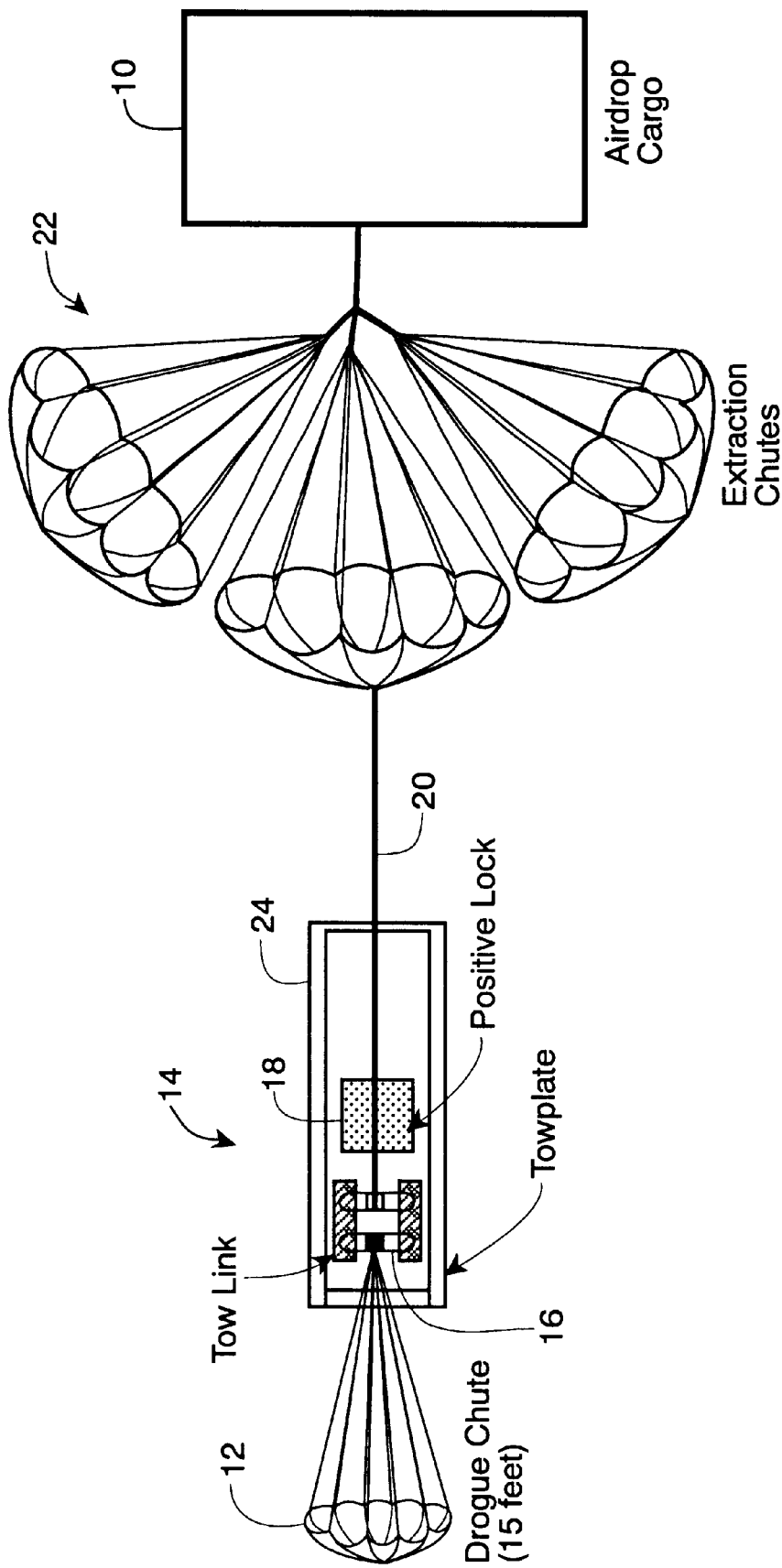
FIG. 1 illustrates schematically the present invention having the positive lock mechanism.

Referring to FIG. 1, a cargo aircraft, not shown, is able to drop a cargo 10 by a parachute(s). A drogue chute 12 is attached to an improved towplate 14. The drogu chute 12 attaches directly to a towlink 16. The towlink 16 is held in place with a positive lock device 18. The forward end of the towlink 16 is connected to a cable 20 having main parachutes 22 thereon as well as the cargo 10. In operation, the drogue chute 12 is deployed and this places the towlink 16 under a significant force. Upon command, the positive lock device 18 releases the towlink 16 which allows the drogue chute 12 to pull the main parachutes 22 from the aircraft followed by the cargo 10.

Figure 2:
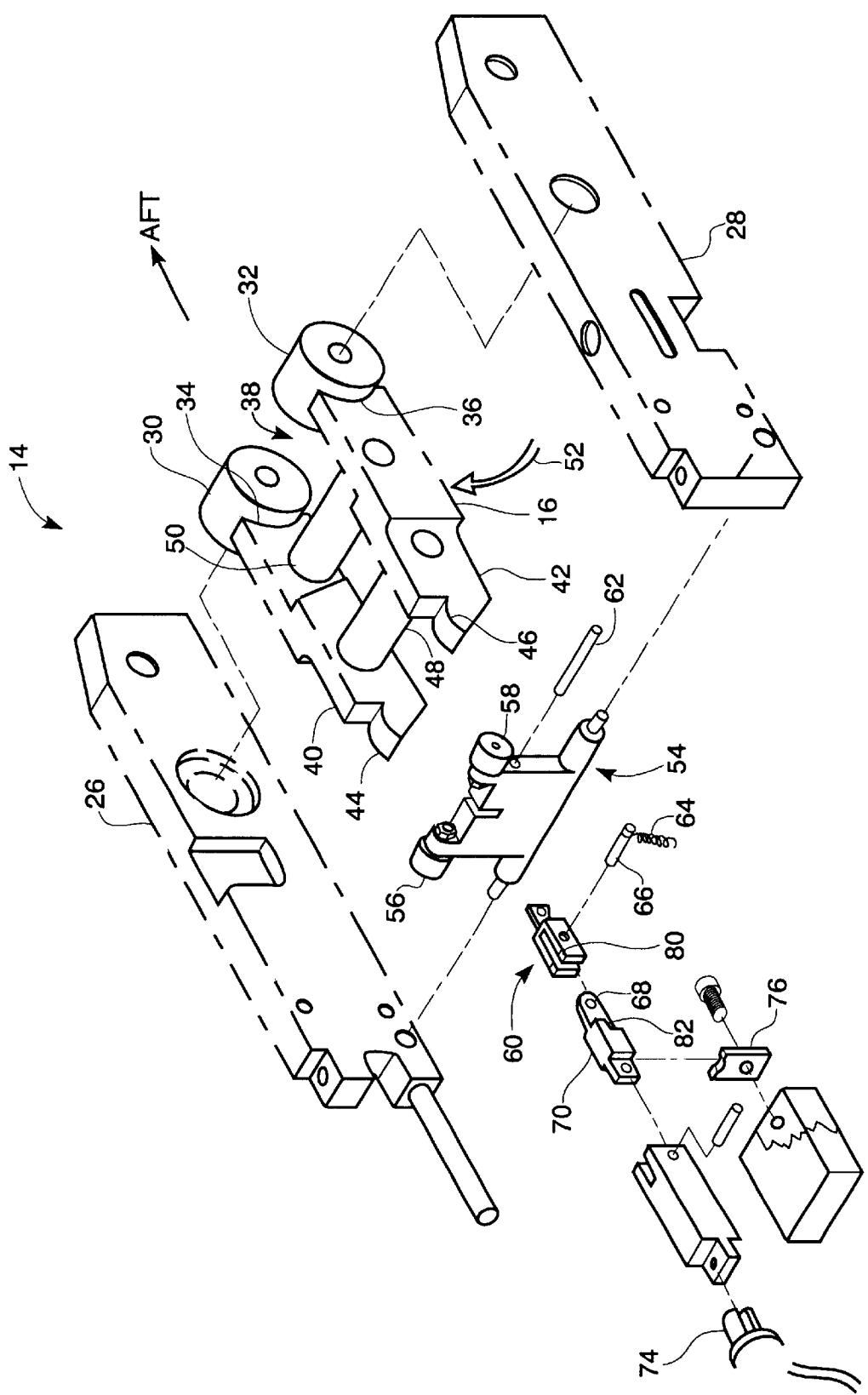
FIG. 2 illustrates in a partially exploded view the positive lock device.

In greater detail, referring to FIG. 2, the improved towplate 14 is only partially shown. A base mounting plate 24 in only shown schematically in FIG. 1. Attached to this mounting plate 24 are a pair of longitudinal towlink brackets 26 and 28. A pair of aft cams 30 and 32 are mounted in these brackets 26 and 28. The towlink 16 has aft cam followers 34 and 36 on the aft end 38 of towlink arms 40 and 42. A pair of forward cams 44 and 46 are a part of the arms 40 and 42, respectively. Attachment links 48 and 50 hold the arms 40 and 42 together and also serve as attachment points for cables. The towlink 16 rotates in the direction of arrow 52 upon release.

A forward cam follower 54 is rotatably mounted to the brackets 26 and 28 and upper rollers 56 and 58 are in contact with the cams 44 and 46 of the towlink 16 when locked. An aft interlock 60 is mounted to the forward cam follower 54 by means of a pin 62. A biasing spring 64 is attached to the aft interlock 60 by means of a pin 66 which further mounts within an elongated hole 68 of a forward interlock 70. The forward interlock 70 is mounted to an interlock support 72 which is further mounted to a solenoid 74, only partially shown. A stop 76 is mounted to the base mounting plate 24 and serves as a means for holding the aft interlock 60 in a locked position.

Figure 3A:
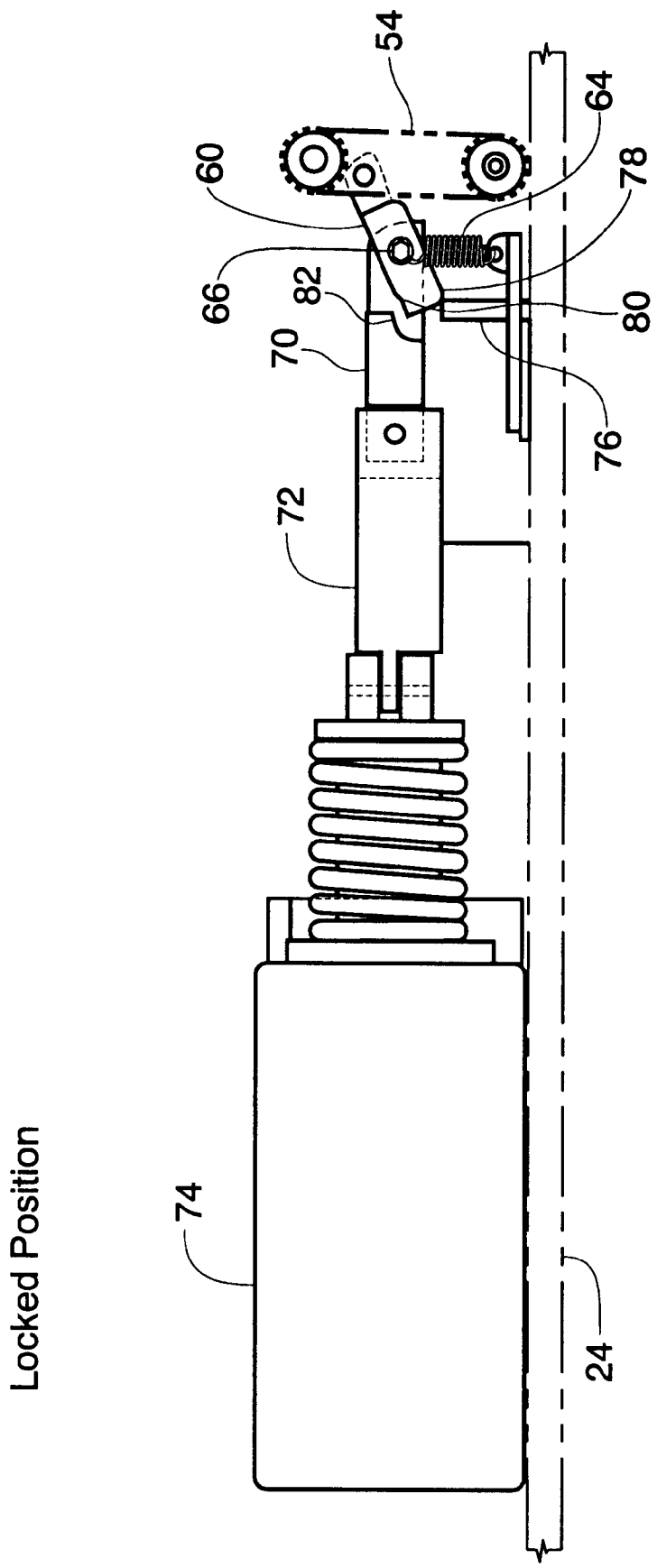
FIG. 3A illustrates by side view the positive lock device in the locked position.
Figure 3B:
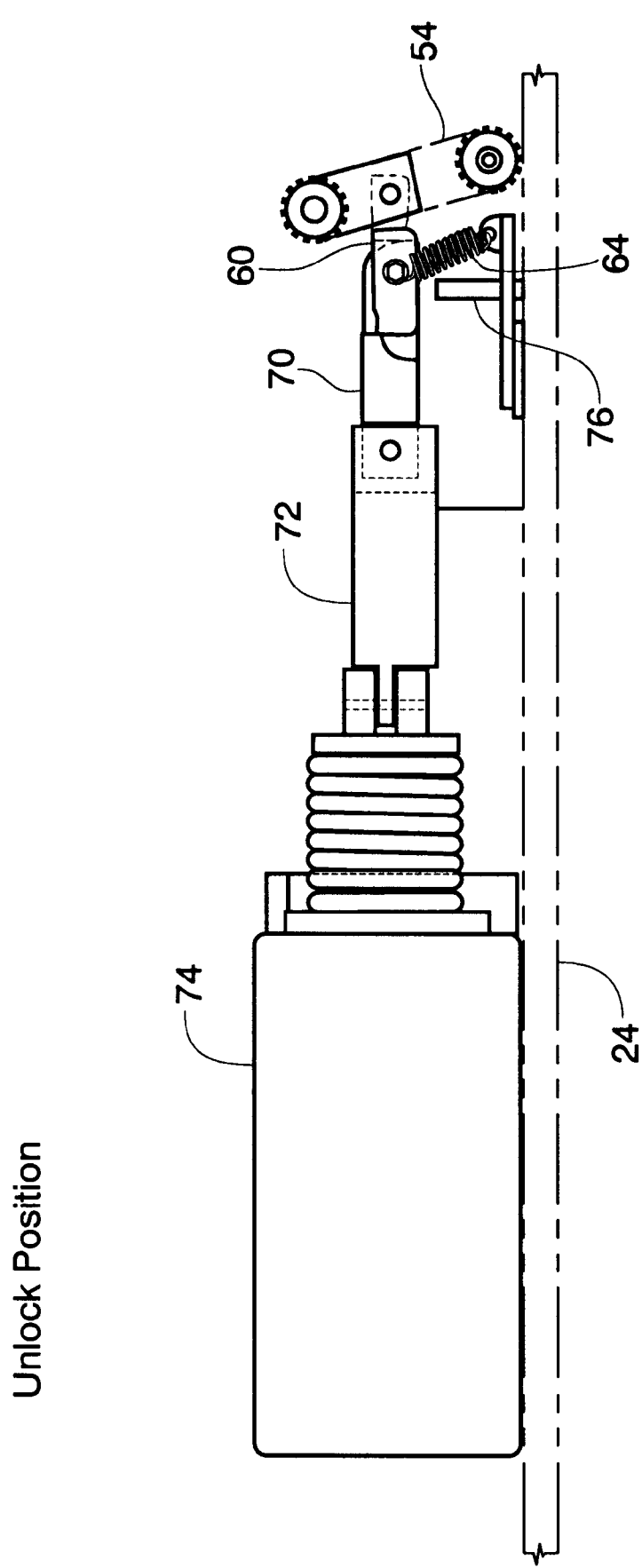
FIG. 3B illustrates by side view the positive lock device in the unlocked position.

To better understand the operation of the positive lock device 18, partial side views of the device are shown in FIG. 3A, locked position, and FIG. 3B, unlocked position.

In the locked position, the solenoid 74 is normally extended and this pushes forward interlock 70 elongated hole 68 against the pin 66. This causes the aft interlock 60 to jam into stop 76 at the rear lower edge 78. This further causes a rear upper ledge 80 to be blocked by a ledge 82 of the forward interlock 70. If the towlink attempts to rotate, this action will be blocked by stop 70 and the blocking action of ledges 80 and 82.

In order to release the towlink 16, the solenoid 74 is retracted in a forwards direction of the aircraft upon command which pulls forward interlock 70 to the left and causes the pin 66 of the aft interlock 60 to move to the right end of the elongated hole 68 which then allows the ledge 80 to clear the ledge 82 as shown in FIG. 3B. Since the forward cam follower 54 is pulled forward, the cams 44 and 46 are cleared and thus towlink 16 may rotate out of the towplate 14. This allows the drogue chute 12 to pull the main parachutes 22 out of the aircraft to open so as to pull the cargo 10 clear of the aircraft.

Therefore, as clearly seen by the above, the towlink 16 is unable to be released until the positive lock device 18 is unlocked by command. Thus the cargo 10 can be dropped in a predetermined manner to land in a drop zone. The other feature is that the towlink 16 can not be removed by the shear force applied by the drogue chute which in the prior art device could have forced the cam follower 54 to be moved.

Clearly many modifications and variations of the present invention are possible in light of the above teachings and it is therefore understood, that within the inventive scope of the inventive concept, that the invention may be practiced otherwise than specifically claimed.

What is claimed is:

1. An improved towplate assembly, said towplate assembly allowing the predetermined release of cargo from an aircraft, a drogue chute and at least one main parachute being attached to a towlink in the towplate, the improved towplate assembly comprising:

a base mounting plate, said base mounting plate mounted in the rear bay of an aircraft;

a pair of longitudinal brackets;

a pair of aft cams, said aft cams mounted in said longitudinal brackets;

a towlink, said towlink having a pair of arms and attachment links for fixedly holding said arms together, said arms having a pair of aft cam followers and a pair of forward cam, said aft cam followers being mounted within said longitudinal brackets against said aft cams;

a forward cam that has a forward cam follower, said forward cam being mounted within the longitudinal brackets to move forward or aft upon command, said forward cam upon a locked condition being in contact with the forward cams of the towlink;

an aft interlock, said aft interlock being connected to said forward cam follower to a spring means for biasing said aft interlock to a locked position;

a forward interlock, said forward interlock being connected to said aft interlock, said forward interlock having a blocking means thereon, said forward interlock having an elongated hole, said elongated hole having a pin therethrough for connecting said forward interlock to said aft interlock;

a support link, said support link connected to said forward interlock and to said solenoid; and a stop, said stop being fixedly attached to said base mounting plate, in a locked position, said aft interlock resting upon said stop;

whereby upon command, said solenoid retracts and pulls the forward interlock forward to cause said pin in said elongated hole to move to an unlocked position, in said unlocked position, said aft interlock clears said blocking means of said forward interlock and said forward cam follower is removed from said forward cams of said towlink, thereby allowing said towlink to be removed from said towplate if there is sufficient force being applied by a deployed drogue chute.

* * * * *